A. H. HAEFELE.
ELECTRODE TERMINAL.
APPLICATION FILED MAR. 31, 1915

1,377,128.

Patented May 3, 1921.

WITNESS
H. G. Grover

INVENTOR.
ALBERT H. HAEFELE
BY Ira J. Adams
ATTORNEY

UNITED STATES PATENT OFFICE.

ALBERT H. HAEFELE, OF LAKEWOOD, OHIO, ASSIGNOR, BY MESNE ASSIGNMENTS, TO NATIONAL CARBON COMPANY, INC., A CORPORATION OF NEW YORK.

ELECTRODE-TERMINAL.

1,377,128. Specification of Letters Patent. Patented May 3, 1921.

Original application filed January 23, 1914, Serial No. 813,928. Divided and this application filed March 31, 1915. Serial No. 18,274.

*To all whom it may concern:*

Be it known that I, ALBERT H. HAEFELE, a citizen of the United States, residing at Lakewood, in the county of Cuyahoga and State of Ohio, have invented a certain new and useful Improvement in Electrode-Terminals, of which the following is a full, clear, and exact description.

This application, which is a division of my application Serial No. 813,928, filed January 23, 1914, relates to a battery connector and is particularly adapted for dry cell carbon electrodes.

It has formerly been the practice to solder, rivet or otherwise fasten a spring clip to the metal cap of a dry cell carbon. The clip and cap are therefore necessarily formed by distinct operations and additional time and labor are required to secure the two together. The voltage of a dry cell is not high and it is important to secure a good electrical connection between the clip and the cap so that there will be no drop in the joint. If the clip is secured to the cap by rivets or screws a high resistance connection frequently results. Even though the connection is in good condition when the cell leaves the factory, the clip is liable to work loose when put in use, which causes a useless waste of energy as well as a low terminal voltage of the cell. Soldered connections are liable to loosen on account of corrosion or electrolytic action and in addition are liable to be knocked off by rough handling. It is the object of my invention to overcome these disadvantages.

In the drawings:—

Figure 5:
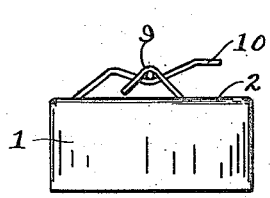
Figs. 5 and 6 are a side and a top view respectively of the modification shown in Fig. 4.
Figure 1:
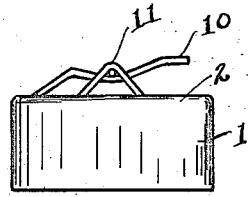
Figure 1 is a side view of the terminal.

In the drawings the cap, which is adapted to be applied to a carbon electrode of a dry cell, consists of a cylindrical side or skirt portion 1 and a top portion 2.

In my form of electrode terminal the clip is drawn or struck up from the top of the cap itself, so that no rivets or solder is necessary. The cap is preferably drawn from spring brass of appropriate thickness and the connector can be made at the same time or afterward. A central tongue or pressure member 10 is stamped out of and extends across the top portion 2 of the cap and has formed in it a wire engaging portion which may be made V-shaped.

On each side of this tongue or pressure member, angular or V-shaped members 11 are struck up from the top portion, but are integral therewith at each end. The V-shaped portions of the tongue and side members extend in opposite directions, so that when the tongue is depressed a conductor wire can be inserted in the endless loops or eyes formed by the members 11 and the part of the top between the ends of each of such members. When pressure is released this wire is rigidly held in position.

To give rigidity to the tongue member, a ridge or furrow 12 is preferably stamped throughout all, or a greater portion, of its length. This also tends to contract the tongue member so that sufficient clearance will be had to permit free movement between the side members.

Figure 4:
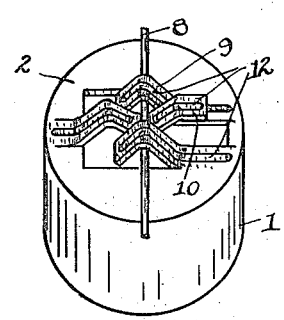
Fig. 4 is a perspective view of a modification.
Figure 6:
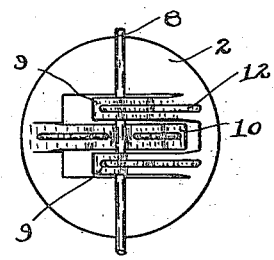

The modification shown in Figs. 4, 5 and 6 differs from that just described in the formation of the side members 9. These are stamped from the top portion of the cap in such a way that they have free ends which preferably extend in a direction opposite to that of the tongue member 10. In this modification it is advisable to form the ridge 12 on all three members.

Figure 2:
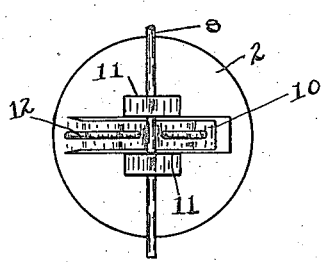
Fig. 2 is a top view.
Figure 3:
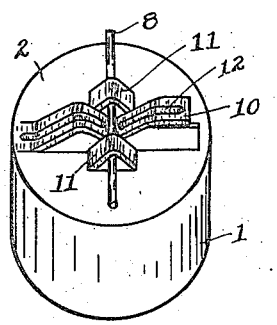
Fig. 3 is a perspective view.

The cap, after having been formed and stamped with the connector of either of the modifications, will be driven over a carbon electrode of a dry cell and no further work on the terminal is necessary. To make a connection the tongue 10 is depressed and the conductor 8 is inserted as shown in Figs. 2 and 3. On releasing the tongue the conductor is firmly held in place.

Having described my invention, what I claim is:—

1. A battery terminal consisting of a cap having a top and a depending skirt portion, a resilient tongue member struck up from the top and having a V-shaped wire engaging depression, and a V-shaped wire engaging member struck up from the top of the cap on each side of the tongue member, said second-mentioned V-shaped members being integral with the cap at both of their ends and adapted to coöperate with the depression to engage a conductor when the tongue is depressed.

2. A battery terminal consisting of a cap having a top and a depending skirt portion, a resilient tongue member struck up from the top and having a wire engaging depression and two hook-shaped members struck up from said top, one on each side of said tongue adapted to coöperate with the depression to engage a conductor when the tongue is depressed.

3. A battery terminal consisting of a top and a depending circular flange, a free ended tongue integral at one end with said top, wire engaging members at each side of the tongue and integral with the top at the side adjacent to the free end of the tongue, said tongue and wire engaging members adapted to detachably hold a terminal wire therebetween.

4. A spring contact comprising a one-piece member consisting of a top and a flange projecting at an angle thereto from one side of the top and a spring tongue formed and struck up from the top at the other side of such top, said tongue lying flatwise across such top, and an endless loop independent of the tongue and also formed and struck up from the top and coöperating with the tongue to hold an electrical connection.

5. A spring contact comprising a one-piece member consisting of a top and a circular flange projecting at an angle thereto from one side of the top and a spring tongue formed and struck up from the top at the other side of such top, said tongue lying flatwise across such top, and a pair of endless loops independent of the tongue and one at each side thereof formed and struck up from the top and coöperating with the spring tongue to hold an electrical connection, the spring tongue being bent upwardly and downwardly and then forwardly so as to exert its pressure in a direction away from the top.

6. A one-piece battery terminal cap comprising a top, a circular flange depending therefrom, a spring tongue struck up from and extending across the upper side of said top, and a pair of wire-receiving eyes struck up from said upper side of said top, said eyes being disposed on opposite sides of said tongue and adapted to coöperate therewith to hold a conductor therebetween, such top, flange, tongue and eyes being formed from a single piece of metal and integrally connected together.

In testimony whereof, I hereunto affix my signature.

ALBERT H. HAEFELE.